Dec. 18, 1951 W. F. ERRIG ET AL 2,578,997
TRANSVERSE TIRE TREAD SLITTING APPARATUS
Filed May 29, 1950
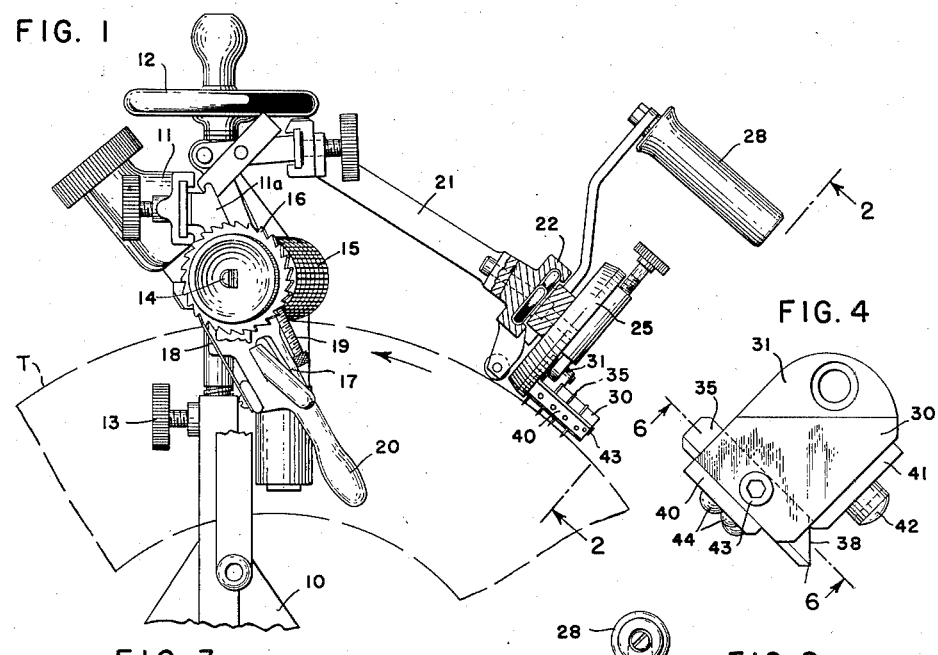
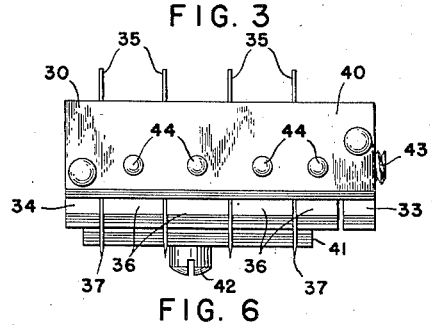
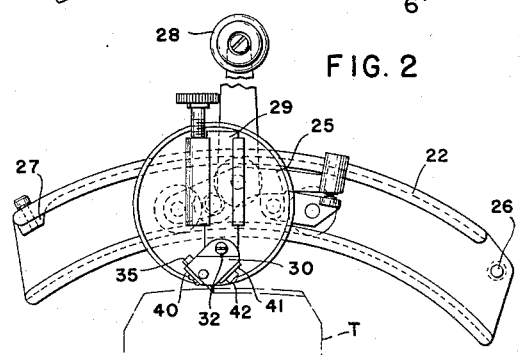
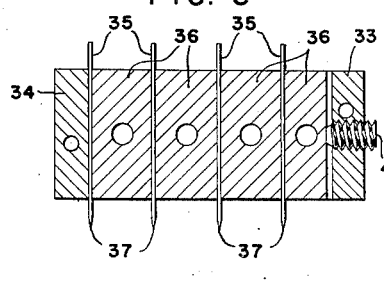
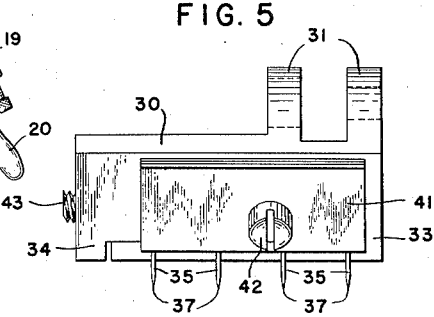
INVENTOR.
WILLIAM F. ERRIG
EDWARD S. DE HART
BY
ATTORNEY.

Patented Dec. 18, 1951

2,578,997

UNITED STATES PATENT OFFICE 2,578,997

TRANSVERSE TIRE TREAD SLITTING APPARATUS

William F. Errig, Jenkintown, Pa., and Edward S. De Hart, Collingswood, N. J.; said De Hart assignor to said Errig Application May 29, 1950, Serial No. 165,068

1 Claim. (Cl. 164—34.5)

This invention relates to transverse tire tread slitting apparatus. It has been found advantageous, in order to reduce the tendency to skidding on wet pavements of a vehicle tire, and more particularly pneumatic tires used on automotive passenger vehicles, to provide on the outer and road engaging portion of the tread, a series of closely spaced transverse slits. These slits consist of cuts or incisions in which no material is removed from the tire tread.

The cutting of slits which are relatively widely spaced has not presented any serious difficulties, but upon attempting to slit the tread transversely with blades closely spaced at a distance between slits of the order of one-sixteenth or three thirty-seconds of an inch difficulties are encountered. There is a tendency of the material being slitted to wedge between the blades and prevent proper slitting with injury to the cutter blades or the tread, or both.

In accordance with the present invention, transverse slitting apparatus is provided with which closely spaced slits may be provided.

In accordance with the present invention, also, transverse slitting apparatus is provided with which closely spaced slits may be provided with the desired distance between slits.

In accordance with the present invention also, an improved arrangement of slitting blades is provided which, with proper linear advancing of the tire tread, may be utilized to provide a plurality of closely disposed slits spaced at a considerably lesser distance than the spacing between the cutter blades.

In accordance with the present invention, also, cutter blades of predetermined spacing may be employed for providing slits in a tire tread at a predetermined spacing differing from and closer than the spacing between the blades.

Other objects and advantageous features of the invention will be apparent from the specification and claim.

The nature and characteristic features of the invention will be more readily understood from the following description, taken in connection with the accompanying drawings forming part hereof, in which:

Figure 1 is a fragmentary side elevational view of a preferred form of apparatus in accordance with the present invention, parts being broken away to show the details of construction;

Fig. 2 is a fragmentary sectional view taken approximately on the line 2—2 of Fig. 1;

Fig. 3 is an underneath view of a preferred form and arrangement of a cutter head and cutter blades employed in connection with the present invention;

Fig. 4 is an end elevational view of the cutter head and blades shown in Fig. 3;

Fig. 5 is a rear elevational view of the cutter head and blades shown in Fig. 3;

Fig. 6 is a sectional view taken approximately on the line 6—6 of Fig. 4;

Fig. 7 is a linear development of a portion of a tire tread showing the initial and subsequent cuts made with the apparatus of the present invention, and Fig. 8 is a fragmentary view showing the mounting and limiting of the ratchet lever.

It should, of course, be understood that the description and drawings herein are illustrative merely, and that various modifications and changes may be made in the structure disclosed without departing from the spirit of the invention.

Like numerals refer to like parts throughout the several views.

Referring more particularly to Fig. 1 of the drawings, a supporting base frame 10 of any preferred type is provided for the support of a tire T to be transversely slitted, and for the movement of the tire T with a predetermined linear advance of the tread. A suitable frame is shown in our prior application for Letters Patent for Tire Groovers, filed March 18, 1948, Serial No. 15,634, now Patent No. 2,532,156.

The frame 10 has a vertically adjustable carriage 11 mounted therein, adjustable vertically by a hand wheel 12 and held in adjusted position by a clamping stud 13.

The carriage 11 has downwardly extending legs 11a, one of which is shown and on which a shaft 14 is journaled. The shaft 14 has a driving roll 15 secured thereon. The driving roll 15 is adapted to engage the periphery of the tire tread for advancing the same in a predetermined direction upon rotation of the shaft 14. The shaft 14 preferably has secured thereto a toothed ratchet 16. A ratchet lever 17 carried on and movable with respect to the shaft 14 is provided and has a pawl 18 for engagement with one of the ratchet teeth of the ratchet 16 in one direction of movement and is adapted to slide over the ratchet teeth in the other direction of movement. The ratchet lever 17 is adapted to abut against the carriage leg 11a upon downward movement (see Fig. 8), thus providing a stop at the lower end of its path of movement and an adjustment screw 19 is adapted to provide a stop abutting against the leg 11a for the upper end of its path of movement. By suitable adjustment of the screw the pawl 18 can be advanced over one or more of the ratchet teeth as desired.

The lever 17 is provided with a manually actuable handle 20 for advancing the tread of the tire through a predetermined angular or linear distance, as hereinafter more fully explained.

The carriage 11 also has mounted thereon a supporting arm 21 at the outer end of which an arcuate trackway or guide is provided conforming in curvature substantially to the transverse curvature of the tire tread, or of the desired shape to determine the depth of cuts or slits at different transverse locations across the tire tread.

A tool supporting carriage 25 is provided which is adapted to travel along the trackway 22. Stops 26 and 27 are provided in the trackway 22 for limiting the travel of the carriage 25.

A manual actuating handle 28 is provided extending upwardly from the tool carriage 25, for manual movement of the carriage 25. A tool post 29 is secured on the tool carriage 25 and has mounted thereon, at its lower end, a cutter head 30 shown in detail in Figs. 3, 4, 5, and 6.

The cutter head 30 preferably includes a body portion with spaced upwardly extending lugs 31 for pivotally mounting the same by a bolt 32 on the tool post 29. A limited movement of the cutter pivotal head 30 is permitted, to a position for cutting, as shown in Fig. 2, and clockwise from that position for a limited extent for return movement without cutting.

The cutter head body also has a pair of spaced downwardly extending end walls 33 and 34 between which a plurality of blades 35 is adapted to be interposed and held in predetermined spaced relationship by spacer blocks 36 of predetermined thickness in accordance with the desired spacing of the blades 35.

Each of the blades 35 consists of a strip having a cutting edge 37, extending longitudinally therealong, and a beveled end 38, extending rearwardly from the forward end of the blade 35.

Between the end walls 33 and 34, on one side, a blade holder plate 40 is provided and secured in position with the edges of the blades 35 extending transversely along its inner face.

Between the end walls 33 and 34, on the other side, a blade gradient bar 41 is provided held in position by a stud 42. The bar 41 has its lower edge in alignment with the beveled ends 38 of the blades 35 and may be turned clockwise or counterclockwise for varying the projection of the blades 35 in a gradient line.

The spacer blocks 36 are preferably held in position in engagement with the blades, to provide a rigid unit, by a set screw 43 extending through the end wall 33, and the blocks 36 are held from accidental removal by loose fitting drive screws 44 which extend through the plate 40 and into the blocks 36.

The mode of operation will now be pointed out.

With a tire T supported in the frame 10 and the carriage 11 mounted to position the driving roll 15 in engagement with the periphery of the tire tread, the transverse slitting operation may then be effected.

The handle 28 may be moved manually to advance the carriage 25 along the trackway 22 (see Fig. 2) so that the cutting edges 37 of the blades 35 cut transverse slits in the tire tread. Upon return movement of the carriage 25 the cutter head 30 will swing about the pivot bolt 32 and the blades 35 will be out of cutting position. As it is desired, however, to provide slits in the tread at predetermined intervals or with predetermined spacing, controlled application of the blades 35 must be effected.

It has been determined that a relation exists between the slit spacing, the cutter spacing and the advancing of the tire tread linearly, which will now be explained. When an even number of cutter blades 35 is employed, the space between each cutter blade 35 in the cutter head 30 is equal to the product of the slit spacing desired on the tire tread, and twice the number of cutters in the cutter head less one.

If the desired slit spacing is designated as $s$, number of cutters is designated as $n$, and the space between cutters is designated as $t$, then $$t = s(2n-1)$$

Accordingly, if the desired slit spacing on the tire is $\frac{1}{16}$ of an inch, and the number of blades 35 in the cutter head 30 is four, the space $t$ between cutters would be $\frac{7}{16}$ of an inch.

The distance the tread is to be linearly advanced, i. e., the tire index spacing, is equal to the product of the slit spacing on the tire tread and the number of blades in the cutter head. If the slit spacing be designated as $s$, the number of cutters as $n$, and the indexing spacing as $p$, then $$p = sn$$

Accordingly, with the desired slit spacing on the tire tread of $\frac{1}{16}$ of an inch and with four cutters, the tire would be indexed $\frac{1}{4}$ of an inch. This indexing is, of course, effected with the ratchet lever 17, the adjustment screw 19 being adjusted to permit the desired stroke.

As illustrated particularly in Fig. 7, when using a cutter holder with four cutter blades 35, six transverse cutting strokes would be required across the tire tread to fill the pattern of slits. For purposes of description, the cuts made by the four cutter blades 35 are designated as A, B, C, and D, respectively, and the subscripts indicate consecutive cutting strokes. With the first stroke, therefore, the cuts $A_1$, $B_1$, $C_1$ and $D_1$, will be made. With the second stroke, the cuts $A_2$, $B_2$, $C_2$, and $D_2$, will be made, until finally, on the 6th stroke, the pattern is completed except for the unfilled section at the start which will be completed when the tire has been indexed through one complete revolution of 360°.

It will thus be seen that with relatively widely separated cutter blades 35, a close spacing of splits may be provided in a relatively simple manner without interference in the action of the individual cutter blades during cutting and without the necessity for employing closely spaced cutters.

The depth of the slits is determined by the setting of the cutter head 30 with respect to the tread of the tire T and if a uniform depth of cut from side to side is desired, this may be controlled by the shape of the guide or trackway 22. Additionally, if desired, by shifting of the gradient bar 41, the simultaneous cutting of slits of varying depths may also be effected.

We claim:

In transverse tire tread cutting apparatus, a tire supporting frame, a transversely disposed guide carried by said frame, a cutter head movably mounted on said guide for movement therealong, a plurality of cutters carried by said head for simultaneous cutting engagement with the tire tread, the spacing between each of the cutters being the product of the dimension of the space between cuts and one less than twice the number of cutters, a driving roll carried by said frame for driving engagement with the tire, and means for actuating said roll for advancing the tread of the tire a distance equal to the product of the dimension of the space between cuts and the number of cutters.

WILLIAM F. ERRIG.
EDWARD S. DE HART.

REFERENCES CITED

The following references are of record in the file of this patent:

UNITED STATES PATENTS

| Number | Name | Date |
| --- | --- | --- |
| 2,028,053 | Errig et al. | Jan. 14, 1936 |
| 2,183,376 | Wikle | Dec. 12, 1939 |